United States Patent [19]

Cutler et al.

[11] Patent Number: 5,500,185
[45] Date of Patent: Mar. 19, 1996

[54] DEOXYGENATION PROCESS

[75] Inventors: Frances M. Cutler, Tustin; Joseph Covey, Long Beach, both of Calif.

[73] Assignee: Southern California Edison, Rosemead, Calif.

[21] Appl. No.: 282,910

[22] Filed: Jul. 29, 1994

[51] Int. Cl.⁶ .............................. C23F 11/06; C02F 1/70
[52] U.S. Cl. ..................... 422/16; 210/668; 210/750; 210/757; 422/13
[58] Field of Search ................. 422/16, 13, 14; 210/668, 669, 750, 757

[56] References Cited

U.S. PATENT DOCUMENTS

| | | | |
|---|---|---|---|
| 3,962,113 | 6/1976 | Schiessl et al. | 210/750 |
| 3,983,048 | 9/1976 | Schiessl et al. | 252/178 |
| 4,269,717 | 5/1981 | Slovinsky | 210/750 |
| 4,287,072 | 9/1981 | Beecher | 210/668 |
| 4,399,098 | 8/1983 | Cuisia | 422/13 |
| 4,556,492 | 12/1985 | Dickerson et al. | 422/14 |
| 4,574,071 | 3/1986 | deSilva et al. | 422/14 |
| 4,629,571 | 12/1986 | Salem et al. | 210/668 |
| 4,655,930 | 4/1987 | Kuhn et al. | 210/668 |
| 4,818,411 | 4/1989 | Dickerson et al. | 210/668 |
| 4,853,135 | 8/1989 | Oeckl et al. | 210/757 |
| 5,108,624 | 4/1992 | Bossler et al. | 210/750 |
| 5,258,125 | 11/1993 | Kelley et al. | 210/750 |

FOREIGN PATENT DOCUMENTS 0140587  5/1985  European Pat. Off. .

OTHER PUBLICATIONS

Harries "Ion Exchange Kinetics in Ultra Pure Water Systems", *J. Chem. Tech. Biotechnol.*, 1991, 51, 437–447.

*Primary Examiner*—Robert J. Warden
*Assistant Examiner*—Robert Carpenter
*Attorney, Agent, or Firm*—Denton L. Anderson; Sheldon & Mak

[57] ABSTRACT

A method for deoxygenating water is provided comprising the steps of (1) adding an oxygen scavenger such as hydrazine, carbohydrazide, diethylhydroxylamine or morpholine to water containing oxygen, contacting the water and the oxygen scavenger with hydroxide, carbonate or carbonate/bicarbonate form strong base anion resin wherein the water within the bed has a pH greater than about 7; and (2) contacting the water containing the oxygen scavenger with the strong base anion resin for at least about one minute and removing from the bed water containing less than about 100 ppb oxygen. The method is especially useful in deoxygenating boiler feedwater and makeup water at substantially ambient temperatures during boiler start-up procedures.

20 Claims, No Drawings

DEOXYGENATION PROCESS

FIELD OF THE INVENTION

This invention relates generally to water deoxygenating processes, and specifically to processes for deoxygenating water to less than about 100 ppb oxygen at substantially ambient temperature conditions.

BACKGROUND OF THE INVENTION

Chemicals commonly known as oxygen scavengers are routinely added to water streams to reduce oxygen concentrations to minute levels. For example, oxygen scavengers are routinely added to boiler feedwater streams to minimize corrosion and deposits within the boiler equipment. In the electrical power industry, oxygen scavengers are added to the boiler feedwater streams to reduce dissolved oxygen in boiler feedwater to very low concentrations, frequently to less than one part per billion ("ppb").

Although the most commonly used oxygen scavengers, such as hydrazine and carbohydrazide, are added to boiler feedwater at temperatures of about 120° F., the rate of reaction between the oxygen scavengers and oxygen in the boiler feedwater does not become rapid until the boiler feedwater reaches temperatures of about 275° F. Only at these elevated temperatures will the oxygen scavenger react rapidly with dissolved oxygen in the boiler feedwater to quickly reduce the oxygen concentration to acceptable levels.

In the electrical power industry, this is generally not a problem because, under normal operating conditions, the recycled condensate is heated as it passes through successive heat exchangers so that the temperature of the feedwater stream is substantially greater than 275° F.

During start-up, however, the boiler feedwater is frequently at substantially ambient temperatures. To reduce dissolved oxygen in these boiler feedwater streams, massive amounts of oxygen scavenger must be used. Alternatively, dissolved oxygen can be removed by heating the boiler feedwater with steam in a mechanical deaerator. Both of these methods can be very expensive. Also, use of massive amounts of oxygen scavenger can produce undesired levels of break-down products and by-products within the boiler feedwater unless additional procedures are employed to promptly remove the excess oxygen scavenger.

Prior attempts to solve this problem have included the attempts to develop a suitable catalyst which would accelerate the reaction of oxygen with the oxygen scavenger at ambient temperatures. So far, however, no catalyst has been found which is inexpensive, easy to use and does not result in increased contamination of the feedwater stream.

Accordingly, there is a need for a method of deoxygenating water at substantially ambient temperatures which is relatively inexpensive and easy to use and which does not contribute unwanted contaminants to the water.

SUMMARY OF THE INVENTION

The invention satisfies this need. The invention is a method for deoxygenating water, such as boiler feedwater, comprising the steps of: (a) adding an oxygen scavenger selected from the group of oxygen scavengers consisting of hydrazine, carbohydrazide, diethylhydroxylamine, morpholine and mixtures and derivatives thereof to oxygen-containing water, the oxygen scavenger being added to the water in an amount sufficient to result in an oxygen scavenger concentration of at least about three times the oxygen concentration; (b) introducing the water with the oxygen scavenger added thereto into a bed of hydroxide, carbonate or carbonate/bicarbonate form strong base anion resin, the water within the bed having a pH greater than about 7, the residence time of the water in the bed being at least about one minute; and (c) removing from the bed water containing less than about 100 ppb oxygen.

Preferably, the pH of the water within the bed is at least about 9, the residence time within the bed is at least about 3 minutes and the water removed from the bed contains less than about 5 ppb.

DETAILED DESCRIPTION OF THE INVENTION

The invention is a method for deoxygenating water comprising the steps of (a) adding an oxygen scavenger to oxygen-containing water, (b) subsequently introducing the water into a bed of strong base anion resin, and (c) removing the water from the bed.

The oxygen scavenger is hydrazine, carbohydrazide, diethylhydroxylamine, morpholine or mixtures and/or derivatives thereof. Hydrazine has the advantage that it decomposes in a way which does not contaminate the anion resin. Carbohydrazide has the advantage of being considered by many to be easier and safer to handle than hydrazine.

In addition to the addition of an oxygen scavenger to the oxygen-containing water, various soluble catalysts commonly known in the art can be added as well. However, this is not generally necessary.

The oxygen scavenger is added to the water so that the concentration of oxygen scavenger within the water is at least about three times the concentration of oxygen in the water.

The strong base anion resin is a hydroxide form, carbonate form or carbonate/bicarbonate form strong base anion resin. The strong base anion resin can be either a gel or a macroporous anion resin. The strong base anion resin can be either a Type 1 or Type 2. The bed can further contain various metallic or other solid catalysts for the oxygen reaction with the oxygen scavenger, but this is not necessary.

The water containing the oxygen scavenger is contacted with the anion resin for a period of at least about one minute, preferably for at least about two minutes, and most preferably, for at least about three minutes.

The pH of the water within the bed must be greater than about 7, preferably greater than about 9, and most preferably between about 9 and about 10.5.

The method is effective in reducing concentrations of oxygen in water from considerably greater than 100 parts per billion down to concentrations less than about 10 parts per billion, usually less than about 3 parts per billion, even in waters at temperatures less than about 100° F.

In one particular embodiment of the invention, a mixed bed condensate polisher can be used to catalyze the deoxygenation of boiler feedwater with an oxygen scavenger. A mixed bed condensate polisher is commonly known to those in the art as a mixed solids bed containing both anion resin and cation resin. Where the anion resin is in the hydroxide form or exhausted to or partially exhausted to the carbonate or carbonate/bicarbonate form, the condensate polisher can be used to deoxygenate water within the system by the following steps: (a) substantially separating the anion resin from the cation resin and disposing the anion resin upstream of the cation resin, (b) adding an oxygen scavenger selected from the group of oxygen scavengers consisting of hydrazine, carbohydrazide, diethylhydroxylamine, morpholine and mixtures and derivatives thereof to the oxygencontaining water upstream of the condensate polisher, (c) contacting the water with the oxygen scavenger added thereto with the anion resin, and (d) removing the water from the condensate polisher.

The residence time within the anion resin is at least about one minute, preferably at least about three minutes. The pH of the water within the anion resin is at least about 7, preferably at least about 9 and most preferably between about 9 and about 10.5.

Where the oxygen scavenger is hydrazine, carbohydrazide, diethylhydroxylamine, morpholine and mixtures and most derivatives thereof, as the water flows out of the anion resin and into the cation resin, any residual oxygen scavenger is effectively exchanged by the cation resin. Where the oxygen scavenger is hydrazine, the decomposition products formed within the anion resin do not tend to exhaust the anion resin. However, where the oxygen scavenger is carbohydrazide, the decomposition reaction forms carbon dioxide which tends to exhaust the anion resin. The decomposition products of morpholine will also tend to exhaust the anion resin.

Where the condensate polisher is a down-flow, vertical column, the anion resin can usually be conveniently separated from the cation resin by simply backflushing the condensate polisher. Because the anion resin is generally less dense, the anion resin will tend to accumulate above the cation resin.

Although the present invention has been described in considerable detail with reference to certain preferred versions, many other versions should be apparent to those skilled in the art. Therefore, the spirit and scope of the appending claims should not necessarily be limited to the description of the preferred versions contained herein.

What is claimed is:

1. A method for deoxygenating water comprising the steps of:
    (a) adding an oxygen scavenger selected from the group consisting of hydrazine, carbohydrazide, diethylhydroxylamine, morpholine and mixtures and derivatives thereof to water containing at least about 100 ppb oxygen, the oxygen scavenger being added to the water in an amount sufficient to result in an oxygen scavenger concentration of at least about three times the oxygen concentration;
    (b) introducing the water with the oxygen scavenger added thereto into a bed of strong base anion resin selected from the group consisting of hydroxide form strong base anion resins, carbonate form strong base anion resins and carbonate/bicarbonate form strong base anion resins, the bed containing no catalyst for the reaction of the oxygen and the oxygen scavenger except for the anion resin, the water within the bed having a pH greater than about 7, the residence time of the water in the bed being at least about one minute; and
    (c) removing from the bed water containing less than about 100 ppb oxygen.

2. The method of claim 1 wherein the anion resin used in Step (b) is a hydroxide form strong base gel anion resin.

3. The method of claim 1 wherein the anion resin used in Step (b) is a macroporous anion resin.

4. The method of claim 1 wherein the oxygen scavenger is selected from the group consisting of hydrazine and carbohydrazide.

5. The method of claim 1 wherein the temperature of the water within the bed is less than about 100° F.

6. The method of claim 1 wherein the water and the bed of Step (b) contain no metallic catalysts for the reaction of oxygen with the oxygen scavenger.

7. The method of claim 1 wherein the pH of the water within the bed is greater than about 9.

8. The method of claim 1 wherein the residence time of the water in the bed in Step (b) is at least about 3 minutes.

9. The method of claim 1 wherein the water removed from the bed in Step (b) contains less than about 10 ppb oxygen.

10. The method of claim 1, wherein the strong base anion resin is a hydroxide form strong base anion resin.

11. A method for deoxygenating water comprising the steps of:
    (a) adding an oxygen scavenger selected from the group consisting of hydrazine, carbohydrazide and mixtures and derivatives thereof to water containing at least about 100 ppb oxygen, the oxygen scavenger being added to the water in an amount sufficient to result in an oxygen scavenger concentration greater than about three times the oxygen concentration to be removed;
    (b) introducing the water with the oxygen scavenger added thereto into a bed of hydroxide form strong base anion resin, the bed containing no catalyst for the reaction of the oxygen and the oxygen scavenger except for the anion resin, the water within the bed having a pH between about 9 and about 9.5, the residence time of the water within the bed being at least about 3 minutes; and
    (c) removing from the bed water containing less than 10 ppb oxygen.

12. The method of claim 11 wherein the water removed from the bed in Step (b) contains less than about 3 ppb oxygen.

13. A method for deoxygenating water in a boiler system having a mixed bed condensate polisher comprising a mixture of cation resin and strong base form anion resin, the method comprising the steps of:
    (a) substantially separating the anion resin from the cation resin and disposing the anion resin upstream of the cation resin;
    (b) adding an oxygen scavenger selected from the group consisting of hydrazine, carbohydrazide, diethylhydroxylamine, morpholine and mixtures and derivatives thereof to water containing oxygen, the oxygen scavenger being added to the water in an amount sufficient to result in an oxygen scavenger concentration of at least about three times the oxygen concentration;
    (c) contacting the water with the oxygen scavenger added thereto with the anion resin, the water within the bed having a pH greater than about 7, the residence time of the water in the bed being at least about one minute; and
    (d) removing from the bed water containing less than about 10 ppb oxygen.

14. The method of claim 13 wherein the strong base anion resin is a gel anion resin.

15. The method of claim 13 wherein the strong base anion resin used in Step (b) is a macroporous anion resin.

16. The method of claim 13 wherein the oxygen scavenger is selected from the group consisting of hydrazine and carbohydrazide.

17. The method of claim 13 wherein the temperature of the water within the bed is less than about 100° F.

18. The method of claim 13 wherein the water and the bed of Step (c) contain no metallic catalysts for the reaction of oxygen with the oxygen scavenger.

19. The method of claim 13 wherein the water and the bed in Step (c) contains no catalysts for the reaction of oxygen and the oxygen scavenger except for the anion resin.

20. The method of claim 13, wherein the bed water removed in Step (d) contains less than about 3 ppb oxygen.

* * * * *